Patented Sept. 14, 1937

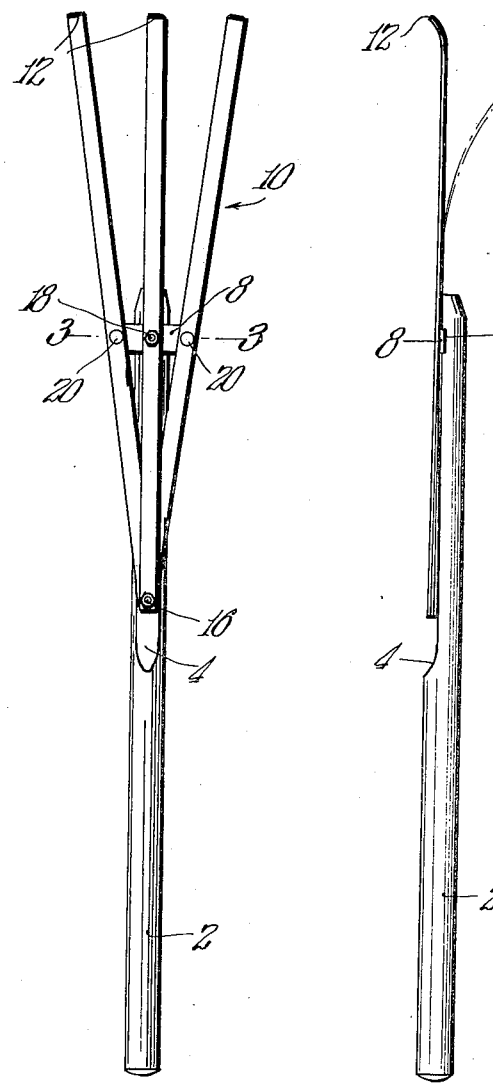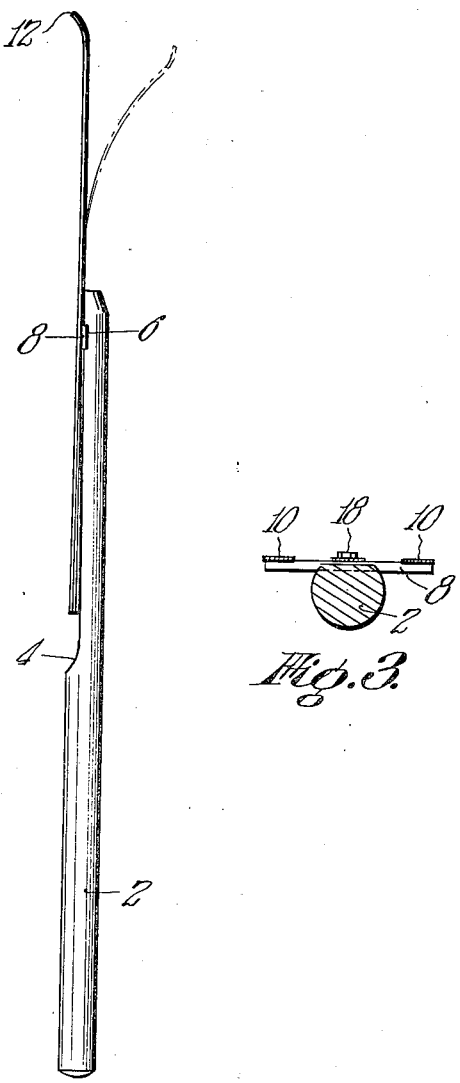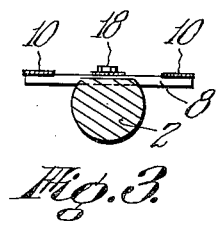

2,093,304

UNITED STATES PATENT OFFICE 2,093,304

GARDEN IMPLEMENT

Warren L. Boyer, Longmeadow, Mass.

Application May 18, 1936, Serial No. 80,223

1 Claim. (Cl. 55—10)

This invention relates to improvements in garden implements and is directed more particularly to a rake-like tool for facilitating the removal of undesirable material from flower beds and from under hedges and similarly in inaccessible places.

It is one of the principal objects of the invention to provide a tool which is sturdy yet simple and inexpensive to manufacture. As one feature of the invention the implement has a substantially flexible working part which is securely attached to a relatively rigid handle.

It is another object of the invention to provide a garden tool whereby the user may easily rake under hedges, barberry bushes, and the like, in order to remove leaves and other undesirable matter therefrom without scratching the hands or arms and at the same time without causing injury to the roots or other parts of the bush.

It is another object of the invention to provide a garden tool for use around hedges, barberry bushes and the like which is comparatively devoid of projecting parts so that it may be safely used without danger of stalks or other parts of the bushes being caught or injured. The tool is so formed that it may be easily manipulated with one hand as contrasted with a rake of usual construction, for example, and, as a special feature, the working parts are preferably arranged in a more or less narrow V-shaped arrangement with respect to the handle so that the hedges, bushes, etc. may be easily worked upon.

Various other objects and advantages of the invention will become more apparent after a reading of the following description and reference will be had therein to the accompanying drawing, wherein:

Fig. 1 is a plan view of the implement of the invention;

Fig. 2 is a side elevational view of the implement shown in Fig. 1; and

Fig. 3 is a sectional view on the line 3—3 of Fig. 1.

Referring now to the drawing more in detail the invention will be fully described.

An elongated handle member 2 is provided and it is preferably formed of some relatively rigid material such as wood or the like. Wood is particularly desirable since it is relatively inexpensive and light in weight and has the desired rigidity.

The rear end portion of the handle 2 is preferably substantially circular in shape so as to be convenient to handle, while the forward end part is chamfered or scarfed on one side so as to have a relatively flat surface 4. This surface 4 is adapted to support the working members of the implement.

Accordingly a transverse groove 6 is provided in the forward part of the handle 2 as shown. Seated in the groove 6 there is a substantially flat and thin bar member 8 which is formed of some relatively stiff sheet material such as metal.

Then extending forwardly beyond the forward end of the handle 2 and in outwardly diverging relation are a plurality of flexible tines or working members 10. These working members 10 are formed of some substantially thin and flat and more or less spring-like sheet metal and all have the greater parts thereof in approximately the same plane. If desired, the outer end parts 12 of the members may be curved upwardly as indicated in Fig. 2 and these, too, are preferably in the same plane with one another.

The inner end portions 14 of these flexible tines 12 are rigidly secured to the handle and preferably in overlapped relation as shown. To this end there extends through all of the tines 12 adjacent their inner ends a bolt or screw 16 which serves to hold the same in proper relation and also as a common point from which they extend.

That is to say, as above stated, the tines extend outwardly from a common jointure in diverging relation and with their main body parts in approximately a common plane. They then overlie the bar 8 intermediate their extremities and are secured thereto in some suitable manner. As shown, there is preferably a central tine and outer tines with screws or rivets 20 securing the outer tines while, if desired, a single bolt, screw or rivet 18 may serve to secure not only the middle tine to the bar 8 but also secure the bar to the handle, as shown.

It will be noticed that with the three tines extending outwardly in diverging relation from a common point as shown, there are no objectionable projections which might be caught on the hedge or shrub stalks. To the contrary, the tines form a more or less narrow V-shaped arrangement with the handle at its apex and the inner end portions of the tines overlapped as stated, so that the tines more or less blend into the handle.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

As a new article of manufacture, a garden implement of the class described comprising in combination, an elongated handle having a forward end portion provided with a flattened face and a groove extending transversely of said face adjacent the forward end of the handle, a single transverse substantially flat and thin bar disposed in said groove, a substantially flat and flexible central tine member in substantial alignment with said handle and having rear and forward end portions and an intermediate portion disposed centrally of said transverse bar, outer tine members arranged in forwardly diverging relation and having rear and forward end portions and intermediate portions disposed in spaced relation on said transverse bar at opposite sides of the intermediate portion of the central tine member, said rear end portions of said tine members being disposed in superposed relation upon said flattened face and said forward end portions extending freely beyond said bar and the forward end of the handle, the said bar terminating at the outer sides of the outermost tine members, a single connection associated with said superposed portions of the tine members and said handle whereby the tine members are secured to the handle, a single connection extending through said central tine member and bar and into the handle whereby the bar and intermediate portion of the central tine member are secured to said handle, and a separate connection associated with each of the other tines and said bar, said forward end portions of the tine members being unconnected and extending freely beyond said bar for independent flexing movements.

WARREN L. BOYER.